United States Patent [19]

Christol et al.

[11] Patent Number: 4,634,294
[45] Date of Patent: Jan. 6, 1987

[54] HAND-HELD DIGITAL TEMPERATURE MEASURING INSTRUMENT

[75] Inventors: James T. Christol, Cupertino; Michael R. Jacobs, Mt. View; Herbert L. Berman, Los Altos Hills, all of Calif.

[73] Assignee: Raytek, Inc., Santa Cruz, Calif.

[21] Appl. No.: 262,936

[22] Filed: May 12, 1981

[30] Foreign Application Priority Data

Sep. 12, 1979 [WO] PCT Int'l. Appl ............... 79/00718

[51] Int. Cl.⁴ .......................... G01J 5/26; G01J 5/60
[52] U.S. Cl. ............................ 374/170; 340/753;
340/584; 340/600; 364/557; 364/525; 374/124;
374/129; 374/130
[58] Field of Search ............... 374/124, 121, 122, 130,
374/129, 133, 2; 356/43, 44; 340/765; 364/557,
414; 250/342

[56] References Cited

U.S. PATENT DOCUMENTS

| | | | |
|---|---|---|---|
| 2,593,897 | 4/1952 | Knudsen | 374/111 |
| 3,017,513 | 1/1962 | Messelt | 250/353 X |
| 3,289,025 | 11/1966 | Bullinger | 340/753 |
| 3,444,739 | 5/1969 | Treharne | 374/133 X |
| 3,617,745 | 11/1971 | Reed | 374/129 X |
| 3,738,099 | 6/1973 | Tanaka | 340/765 X |
| 3,777,568 | 12/1973 | Risgin et al. | 374/128 |
| 3,802,249 | 4/1974 | Clawson | 374/2 |
| 3,916,690 | 11/1975 | Brandli | 374/129 |
| 3,938,386 | 2/1976 | Comfort et al. | 374/110 X |
| 3,947,722 | 3/1976 | Strom et al. | 340/753 X |
| 4,005,605 | 2/1977 | Michael | 374/133 X |
| 4,078,179 | 3/1978 | Everest | 250/338 |
| 4,114,442 | 9/1978 | Pratt | 374/167 X |
| 4,161,880 | 7/1979 | Prosky | 364/557 X |
| 4,172,383 | 10/1979 | Iuchi | 374/9 |
| 4,176,556 | 12/1979 | Takenaka | 364/557 X |
| 4,242,679 | 12/1980 | Morozumi et al. | 350/331 T X |
| 4,301,682 | 11/1981 | Everest | 374/112 |
| 4,315,150 | 2/1982 | Darringer et al. | 250/353 X |
| 4,338,600 | 7/1982 | Leach | 350/331 T X |
| 4,371,271 | 2/1983 | Bellet | 374/208 X |
| 4,388,139 | 6/1983 | Fuller | 374/162 X |

OTHER PUBLICATIONS

"Digital/Analog Infrared Thermometer", *Australian Electronics Engineering*, Nov. 1975, vol. 8, No. 11, p. 45.

*Primary Examiner*—Daniel M. Yasich
*Attorney, Agent, or Firm*—Townsend and Townsend

[57] ABSTRACT

Hand-held instrument for measuring the temperature of a target without contact with the target. The instrument utilizes a microprocessor and a digital display to calculate and indicate different temperature functions. Compensation is included for the effects of emissivity and ambient temperature changes which otherwise could result in inaccurate readings. Temperature trend direction liquid crystal arrow(s) actuated by the microprocessor are included in the display.

18 Claims, 5 Drawing Figures

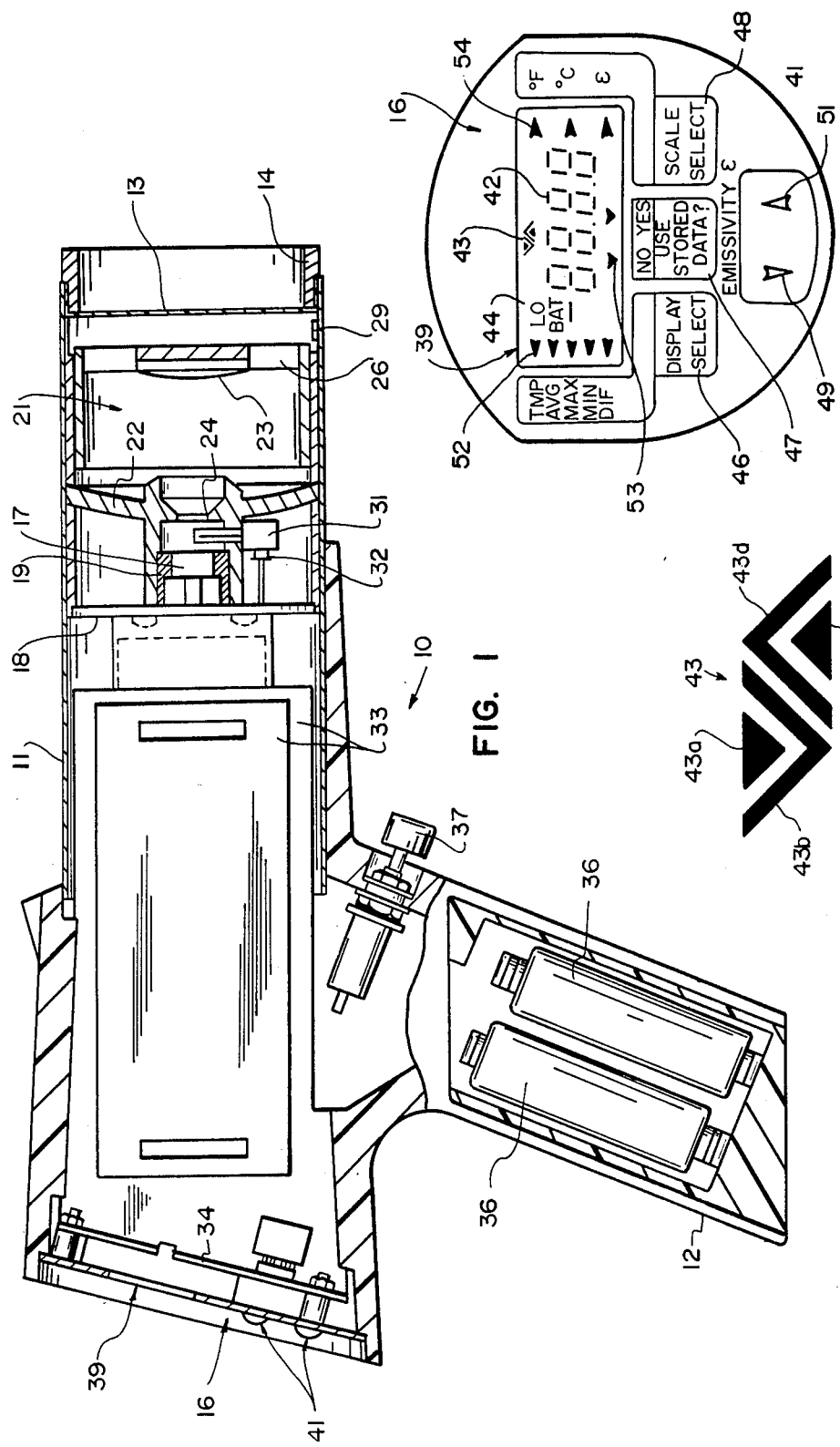

HAND-HELD DIGITAL TEMPERATURE MEASURING INSTRUMENT

This invention pertains generally to temperature measuring equipment and more particularly to a hand-held instrument for measuring the temperature of a target without contact with the target.

Hand-held instruments heretofore provided for use in non-contact temperature measurements have had certain limitations and disadvantages. Such instruments generally operate by sensing infrared energy radiated by the target and determining the temperature of the target from the level of this energy. These instruments are generally analog devices, and the temperature is indicated by a meter of the galvanometer type. If the target is not a perfect source (emissivity=1.0), it will reflect energy from the surrounding environment as well as radiating its own energy, and this reflected energy can produce erroneous temperature readings. Likewise, even small changes in the ambient temperature can cause significant errors in the measurements of infrared energy and consequently in the temperature reading.

It is in general an object of the invention to provide a new and improved instrument for measuring the temperature of a target without contacting the target.

Another object of the invention is to provide an instrument of the above character which provides compensation for emissivity and ambient temperature in determining the temperature of the target.

Another object of the invention is to provide an instrument of the above character which has a digital output display.

Another object of the invention is to provide an instrument of the above character which has a trend indicator for indicating the direction and magnitude of changes in the temperature of the target.

Another object of the invention is to provide an instrument of the above character which can store data from previous measurements and combine the stored data with current data to determine temperature functions such as average temperature, maximum temperature, minimum temperature and the difference between maximum and minimum temperature.

These and other objects are achieved in accordance with the invention by providing a hand-held instrument having an infrared detector for receiving energy from the target, a first temperature sensor responsive to ambient temperature, a reference body which is periodically moved into the path of the detector so that the detector alternately receives energy from the target and from the reference body, and a second temperature sensor responsive to the temperature of the reference body. The signals from the infrared detector and the sensors are combined in determining the temperature of the target according to the relationship $$N_S(T_S) = \frac{K_G(S_1 - S_2) - N_A(T_A)(1 - E_S) + N_F(T_F)}{E_S},$$

where $N_S(T_S)$ is the radiance of a black body at the temperature of the target $K_G$ is a scale factor constant, $S_1$ is the detector reading corresponding to the target, $S_2$ is the detector reading corresponding to the reference body, $N_A(T_A)$ is the radiance of a black body at the ambient temperature measured by the first temperature sensor, $N_F(T_F)$ is the radiance of a black body of the reference body temperature measured by the second temperature sensor, and $E_S$ is the emissivity of the target. The temperature of the target $T_S$ is then determined from a look-up table based on the relationship $$N\lambda(\lambda,T) = \int_{\lambda_1}^{\lambda_2} \frac{C_1 \lambda^{-5}}{e^{\frac{C_2}{\lambda T}} - 1} d\lambda,$$

where $N\lambda(\lambda,T)$ is the energy of wavelength $\lambda$ produced by the target, $T$ is the termperature of the target, $\lambda_1$ and $\lambda_2$ are the lower and upper limits of the wavelengths of energy reaching the detector from the target, $C_1 = 3.74 \times 10^{-12}$ watt·cm$^2$, and $C_2 = 1.44$ cm·°K.

Data from previous temperature measurements is stored in a memory, for combination with the data for a current measurement to determine average temperature, maximum temperature, minimum temperature, and the difference between maximum temperature and minimum temperature. The desired temperature is displayed by a digital display, and a trend indicator indicates whether the current temperature is increasing or decreasing. The value of emissivity used in the temperature calculation can be increased or decreased to adjust the instrument to match a target of known emissivity or known temperature.

FIG. 1 is a sectional view, somewhat schematic, of one embodiment of a temperature measuring instrument according to the invention.

FIG. 2 is an elevational view of the display and control panel of the instrument of FIG. 1.

FIG. 3 is an enlarged view of a temperature trend indicator on the control and display of FIG. 2.

Figure 4:
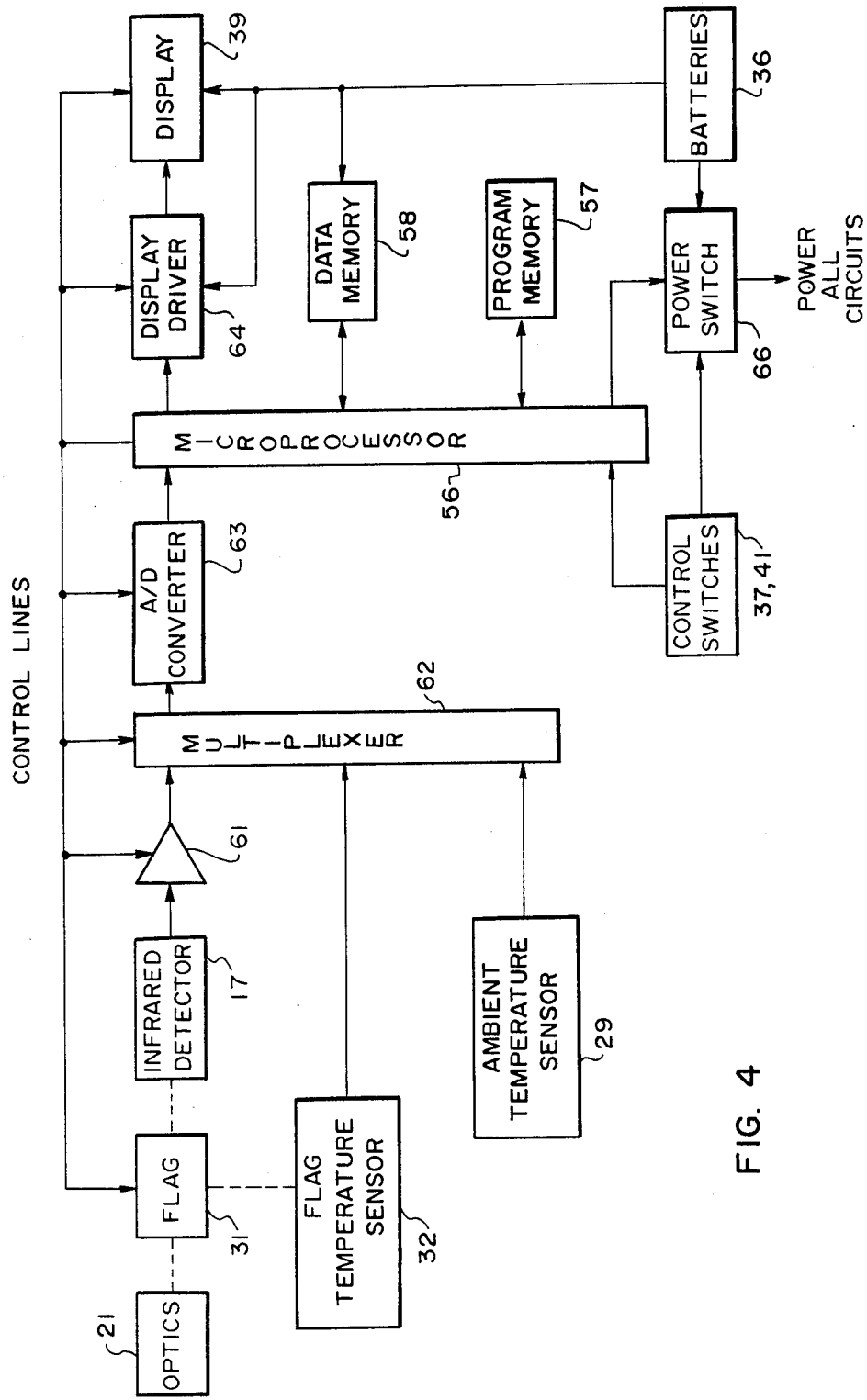
FIG. 4 is a block diagram of the instrument of FIG. 1.

As illustrated in FIG. 1, the temperature measuring instrument includes a generally pistol-shaped housing 10 having a generally cylindrical barrel 11 and a handle 12 which is adapted to be gripped by the hand of a user. The front end of the barrel is provided with a window 13 which is held in place by a retaining ring 14. The window is fabricated of a material such as plastic film which is transparent to infrared radiation in the portion of the infrared spectrum of interest. A display and control panel 16 is provided toward the rear of the instrument and serves as a closure for the back end of the barrel. This panel faces the user when the front end of the barrel is pointed toward a target. In the preferred embodiment, the handle and barrel are fabricated of a rigid, light weight material, such as aluminum.

Means is provided for sensing infrared radiation from a target and providing an electrical signal corresponding thereto. This means includes an infrared detector 17 which, in the preferred embodiment, comprises a thermopile detector consisting of a plurality of thermocouple junctions connected in series and arranged in a radial pattern. All of the hot junctions are positioned toward the center of the detector, and the cold junctions are arranged in a circle around the hot junctions. The detector is mounted on a radially extending circuit board 18 and positioned facing forward, with the hot junctions of the detector aligned with the axis of the barrel. The detector includes a filter which passes the portion of the infrared spectrum of interest (e.g. 8–14 microns) and a heat sink 19 is provided for the detector.

Optical means 21 is mounted in the barrel in front of the detector for receiving infrared radiation through window 13 from a predetermined field of view and directing this energy toward the detector. In the preferred embodiment, this means comprises a folded mirror system having a forwardly facing primary mirror 22 in front of the detector and a rearwardly facing secondary mirror 23 behind the window. Radiation passing through the window from the field of view defined by the mirror system impinges upon the primary mirror and is reflected to the secondary mirror. From the secondary mirror, the radiation is reflected back through a central aperture 24 in the primary mirror to the detector. In the embodiment illustrated, the primary mirror is a concave spherical mirror, the secondary is a convex spherical mirror, and the mirror system has a 4° conical field of view. The mirror system is positioned coaxially of the barrel, and the incoming radiation is focused on the hot juctions of the detector. The secondary mirror is of smaller diameter than the barrel, and it is supported in an axial position by a plurality of radially extending arms or spokes 26 which permit the incoming radiation to reach the primary mirror.

An ambient temperature sensor 29 is mounted in the barrel and positioned toward the front end thereof. In the embodiment illustrated, this sensor is mounted on the inner wall of the barrel immediately behind window 13. This sensor is of conventional design, and it provides an electrical signal corresponding to the ambient temperature of the environment in which the instrument is used.

A reference body or flag 31 is pivotally mounted between primary mirror 22 and detector 17. This flag is driven by an electrically operated actuator for periodic movement into and out of the path of the incoming radiation so that detector 17 alternately receives radiation from the target and from the flag. A temperature sensor 32 monitors the temperature of the flag and provides an electrical signal corresponding thereto.

Circuitry for processing the signals from detector 17 and temperature sensors 29, 32 to determine the temperature of the target is mounted on circuit board 18 and on additional circuit boards 33 in the rear portion of the barrel. Circuit elements associated with the display and control panel are mounted on a circuit board 34 positioned immediately in front of that panel. Interconnections between the circuit boards are made by conventional means, which have been omitted from the drawings for clarity of illustration.

The entire unit is powered by batteries 36 which are mounted in the handle of the housing. A trigger switch 37 is also mounted on the handle in position to be depressed by the forefinger of the hand gripping the handle. As discussed more fully hereinafter, closure of this switch conditions the unit to take a new temperature reading. When the trigger is released, data from previous readings is displayed.

Referring now to FIG. 2, panel 16 comprises a display 39 and a group of switches 41 which, together with trigger switch 37, control the operation of the instrument. In the preferred embodiment, the display is a liquid crystal display comprising a digital display 42, a trend indicator 43, a low battery indicator 44, and a plurality of arrows for indicating the states or positions of the control switches on the panel. As discussed more fully hereinafter, digital display 42 is utilized for indicating temperature and emissivity, and trend indicator 43 indicates the direction and magnitude of changes in the measured temperature.

The trend indicator includes a small downwardly pointing arrow 43a which is illuminated for small decreases in temperature, a large downwardly pointing arrow 43b which is illuminated for large decreases in temperature, a small upwardly pointing arrow 43c which is illuminated for small increases in temperature, and a large upwardly pointing arrow 43d which is illuminated for large increases in temperature. This display provides a quick indication of the direction and magnitude of a change in temperature, and is helpful in locating areas of maximum and minimum temperature in a target. Examples of known direction type of indicators are shown in U.S. Pat. Nos. 3,289,025 and 3,738,099.

Low battery indicator 44 is illuminated when the battery voltage drops to the level at which the batteries should be replaced.

The control switches on panel 16 include a DISPLAY SELECT switch 46, a USE STORED DATA switch 47, a SCALE SELECT switch 48, an emissivity decrementing switch 49, and an emissivity incrementing switch 51. These switches are all "snap action" membrane type push button switches which provide a discernible movement when depressed without penetrating the panel.

The DISPLAY SELECT switch conditions the display to display either the current temperature reading TMP, an average temperature reading AVG, a maximum temperature reading MAX, a minimum temperature reading MIN, or the difference DIF between the maximum and minimum readings. When this switch is depressed, the display cycles between the different functions, with the current function being indicated by arrows 52 in the display.

USE STORED DATA switch 47 permits the operator or user to determine whether data stored in memory from previous readings is to be combined with the current temperature reading to determine the average temperature, maximum temperature, minimum temperature, and the difference between the maximum and minimum temperatures. Depressing the switch causes the signal processing circuitry to cycle between the two functions, with the current function being indicated by arrows 53 in the display.

SCALE SELECT switch 48 determines whether the display provides a reading of temperature in °F., temperature in °C., or emissivity. The instrument cycles between these functions when the switch is depressed, with the current function being indicated by arrows 54 in the display.

Switches 49, 51 permit the instrument to be calibrated in accordance with the emissivity of the target. As discussed more fully hereinafter, a number corresponding to emissivity is stored and utilized in the calculation of temperature. Depressing switch 49 causes the emissivity signal to be decremented, and depressing switch 51 causes the emissivity signal to be incremented.

Means is provided for processing the signals from detector 17 and temperature sensors 29, 32 to determine the temperature of the target. As illustrated in FIG. 4, this means includes a microprocessor 56 having a program memory 57 and a data memory 58 associated therewith. Operation of the microprocessor is controlled by a program stored in memory 57 and by trigger switch 37 and panel switches 41.

The signal from detector 17 is applied to the input of an amplifier 61, the gain of which is controlled by the microprocessor. The output of this amplifier is applied to one input of a multiplexer 62, the operation of which is controlled by the microprocessor. The signals from temperature sensors 29 and 32 are applied to other inputs of the multiplexer, and the output of the multiplexer is connected to the input of an analog-to-digital converter 63 which converts the analog input signals to the digital format required by the microprocessor. The A/D converter is controlled by the microprocessor, and the signals from this converter are applied to the data inputs of the microprocessor.

Data output from the microprocessor is delivered, to display 39 via a display driver 64. Operation of both the display driver and the display itself is controlled by the microprocessor.

Operating power from batteries 36 is applied directly to data memory 58, display driver 64, and display 39. These elements remain energized continuously to provide a display of the last function selected by the operator. These circuits are all low power devices which drain very little power from the batteries. With only these elements energized, the operating life of the batteries approaches the normal shelf of the batteries, e.g. 10 years.

The application of operating power to the remaining circuits is controlled by a power switch 66 which, in turn, is controlled by the microprocessor and by control switches 37, 41. The power switch includes a reed relay which is controlled by a flip-flop. The flip-flop is set by closure of any one of the control switches and reset by the microprocessor upon the release of all switches and the completion of its current operation.

Thus, when any control switch is depressed, the microprocessor turns on, completes its function, and turns off immediately. This results in a substantial saving of power and an extended battery life since the microprocessor and other circuits which require relatively high operating power are energized only a small portion of the time. For example, if the DISPLAY SELECT switch is depressed to recall the average temperature AVG from memory, the processor will be on for less than 200 milliseconds.

The movement of the reference body or flag 31 is controlled by the microprocessor. Prior to taking a temperature measurement from the target, the flag is moved into the optical path, and a reading is made of the flag by detector 17. Once this reading has been made, the flag is moved out of the optical path so that a reading can be made of the target.

Figure 5:
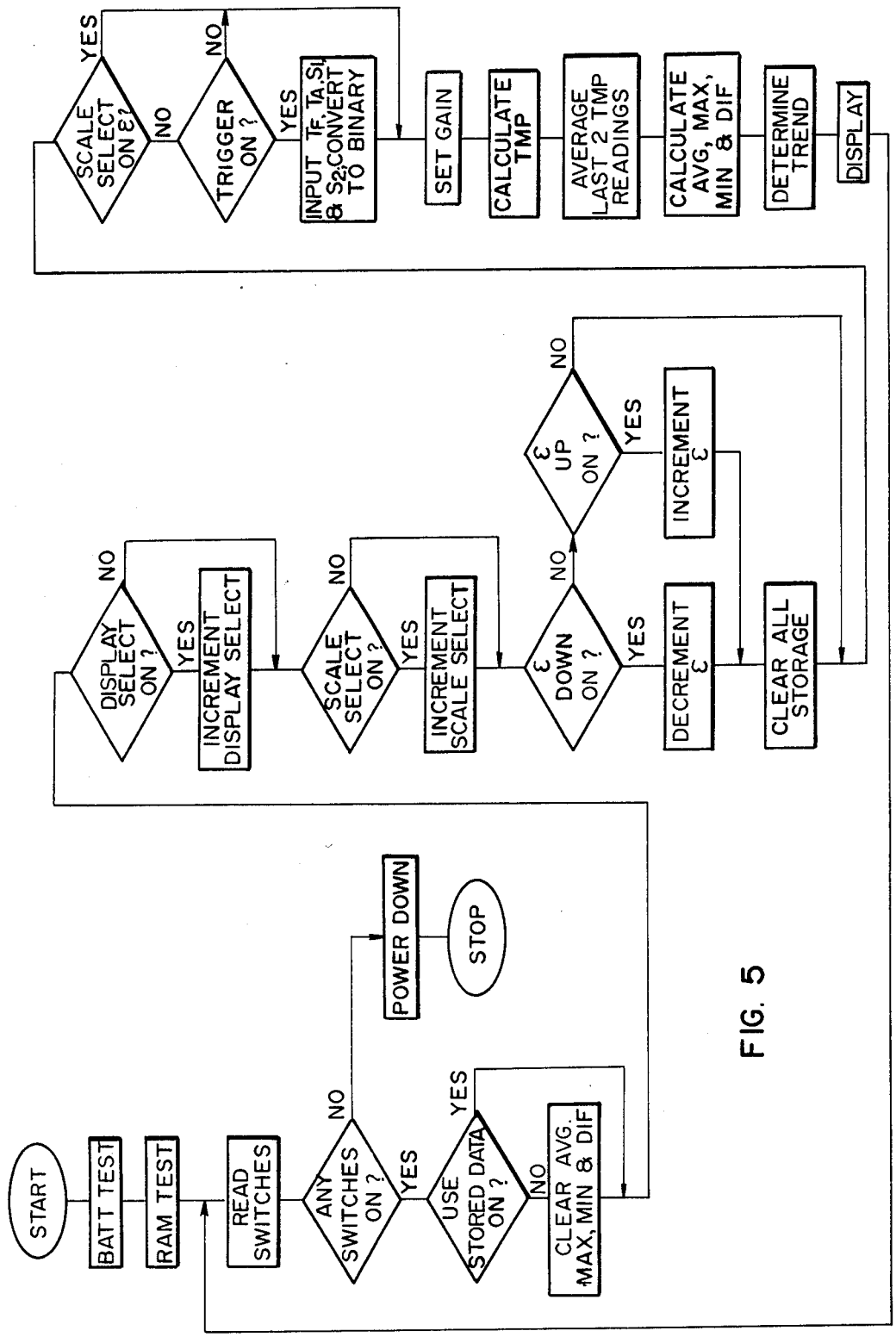
FIG. 5 is a flow chart for the signal processing circuitry of the instrument of FIG. 1.

Referring now to the flow chart of FIG. 5, operation of the signal processing circuitry is initiated by closure of one of the control switches. At the outset of each operation, the battery voltage is checked, and if it is below the desired level, the low battery indicator in the display is illuminated. The data memory is then tested, and if no emissivity value $E_S$ is present, the emissivity is set to 1.0, and the operator must input a value of emissivity before any reading is taken. If the memory is bad, the display flashes.

The input switches are then read, and if no switch is depressed, the power is turned off and the operation terminates. If the USE STORE DATA switch is on, the mode will change from one mode to the other with each depression of the switch. If USE STORED DATA is in the YES mode, previously stored values of the average, maximum, minimum and difference temperatures are retained in the memory. If USE STORED DATA is in the NO mode, these values are cleared from the memory. If the DISPLAY SELECT switch is on, the display selector is incremented to the next function, e.g. from AVG to MAX. If the SCALE SELECT switch is on, the scale selector is incremented to the next function, e.g. from °F. to °C.

If switch 49 is depressed, the stored value of emissivity $E_S$ is decremented, and if switch 51 is depressed, the emissivity signal is incremented. If the emissivity is changed, all previously stored data is cleared from the memory.

If the SCALE SELECT switch is in either the °F. or the °C. position and the trigger switch is depressed, the flag temperature reading $T_F$ from sensor 32, the ambient temperature $T_A$ from sensor 29, the target reading $S_1$ from detector 17, and the flag reading $S_2$ from detector 17 are all input, converted to binary form, and stored in the data memory. If the SCALE SELECT switch is in the emissivity position or the trigger switch is off, these new readings are not taken, and only the previously stored data is utilized in the subsequent calculations.

The gain of amplifier 61 is set in accordance with the desired range of operation and maintained at this level by the microprocessor.

The current temperature TMP is then calculated according to the following relationship $$N_S(T_S) = \frac{K_G(S_1 - S_S) - N_A(T_A)T_W(1 - E_S) - N_A(T_A)(1 - T_W) + N_F(T_F)}{E_S T_W},$$

where $N_S(T_S)$ is the radiance of a black body radiator at the temperature of the target, $K_G$ is a scale factor constant, $S_1$ is the detector reading for the target, $S_2$ is the detector reading for the reference body or flag, $N_A(T_A)$ is the radiance of a black body at the ambient temperature reading from sensor 29, $N_F(T_F)$ is the radiance a black body at the reference body temperature reading from sensor 32, $T_W$ is the transmissivity of the window, and $E_S$ is the stored emissivity signal.

For a window transmissivity of 1.0, this relationship becomes $$N_S(T_S) = \frac{K_G(S_1 S_s) - N_A(T_A)(1 - E_S) + N_F(T_F)}{E_S}.$$

The current temperature TMP of the target is then determined from a look-up table based on the relationship $$N\lambda(\lambda, T) = \int_{\lambda_1}^{\lambda_2} \frac{C_1 \lambda^{-5}}{e^{\frac{C_2}{\lambda T}} - 1} d\lambda,$$

where $N\lambda(\lambda, T)$ is the energy of wavelength $\lambda$ produced by the target, T is the termperature of the target, $\lambda_1$ and $\lambda_2$ are the lower and upper limits of the wavelengths of energy reaching the detector from the target, $C_1 = 3.74 \times 10^{-12}$ watt·cm², and $C_2 = 1.44$ cm·°K.

The TMP signal $T_S$ thus obtained is stored and combined with the next TMP signal to provide an output signal which is stored and displayed to indicate the temperature of the target. Averaging the temperature readings in this manner has been found to provide a more stable and accurate temperature measurement than a single reading. The average temperature AVG, the maximum temperature MAX, the minimum temperature MIN, and the difference DIF between the maximum temperature and minimum temperatures are then calculated or updated, and this data is stored in the data memory.

The successive temperature readings TMP are compared to determine the direction and magnitude of any change in the target temperature. This information is stored and utilized to control the actuation of the trend indicator in the display.

When the calculations are completed, the selected information is displayed, and the input switches are read again. The operation continues as long as any of these switches is depressed. When no switch is depressed, the power is turned off, and the operation is completed.

Operation and use of the instrument can now be described. Prior to making a temperature measurement, the instrument is set for the emissivity of the target. If the emissivity is known, the emissivity can be set by placing SCALE SELECT switch 48 in the emissivity position and depressing either switch 49 or 51 until the correct emissivity is indicated by the display. If the emissivity is not known, it can be set with a target of known temperature. In this case, the display is set to indicate temperature, and switch 49 or switch 51 is depressed until the temperature indicated matches the known temperature of the target. Since the temperature reading varies inversly with emissivity, switch 49 produces an increase in the displayed temperature and switch 51 produces a decrease.

To determine the temperature of a target, the DISPLAY SELECT switch is set to the TMP position, the SCALE SELECT switch is set to either the °F. position or the °C. position, the instrument is pointed toward the target, and the trigger switch is depressed. The display will then indicate the current temperature of the target, with temperature readings being taken at a rate of about 4 per second. If the trigger is released, the display will continue to display the last temperature reading made prior to the release of the trigger.

With the trigger pulled the display selector in the AVG position, and the USE STORED DATA switch in the NO mode, a running average of all temperature readings since the trigger was pulled is displayed. When the trigger is released, the display indicates the average temperature during the time the trigger was pulled.

With the display selector in the MAX position, the USE STORED DATA switch in the NO mode and the trigger pulled, the display indicates the highest temperature reading since the trigger was pulled. When the trigger is released, the display indicates the maximum temperature during the time the trigger was pulled.

With the display selector in the MIN position, the USE STORED DATA SWITCH in the YES mode and the trigger pulled, the display indicates the lowest temperature reading since the trigger was pulled. When the trigger is released, the display continues to indicate this minimum reading.

With the display selector in the DIF position, the USE STORED DATA switch in the NO mode and the trigger pulled, the display indicates the difference between the highest and lowest temperature readings since the trigger was pulled. When the trigger is released, the display continues to indicate this difference.

The current temperature reading can be combined with data stored from previous temperature readings in determining the average temperature, the maximum temperature, the minimum temperature, and the difference between the maximum and minimum temperatures. The current temperature reading TMP, however, is not affected by the use of the stored data. When the stored data is used, the average temperature reading AVG is a running average of all temperature readings since the USE STORED DATA switch was set to the YES position. When the trigger is released, no new temperature reading is taken, and the display indicates the average of the temperature readings taken between the time the USE STORED DATA switch was set to YES and the time the trigger was released.

When the stored data is used for the MAX and MIN readings, the display indicates the highest and lowest temperatures for all trigger pulls since the USE STORED DATA switch was set to YES. Likewise, the DIF reading corresponds to the difference between the highest and lowest temperatures for all trigger pulls since the USE STORED DATA switch was set to YES. Releasing the trigger does not change any of these readings since no new readings are being taken.

As the instrument is scanned or swept across a target, the operator can determine the direction and magnitude of changes in the target temperature by observing trend indicator 43. This indicator is particularly useful in locating areas of maximum and minimum temperature in the target.

The invention has a number of important features and advantages. The temperature of a target is determined in a manner which minimizes errors due to ambient temperature changes and reflections from targets having an emissivity less than 1.0. The instrument is very flexible in operation, permitting the operator to selectively display current temperature, average temperature, maximum temperature, minimum temperature, or the difference between maximum and minimum temperature. The temperatures can be displayed in either Farenheit or Celesius units, and the instrument has a range on the order of 20° F. (−30° C.) to 2000° F. (1100° C). The trend indicator provides a quick indication of the direction and magnitude of any changes in temperature, and the instrument is readily adjusted in accordance with the emissivity of the target.

It is apparent from the foregoing that a new and improved instrument for measuring temperature without contact with a target has been provided. While only one presently preferred embodiment has been described in detail, as will be apparent with those familar with the art, certain changes and modifications can be made without departing from the scope of the invention as defined by the following claims.

What is claimed is:

1. In an instrument for measuring the temperature of a target without contact with the target: an infrared detector for providing a reading in the form of an electrical signal corresponding to infrared energy impinging thereon, optical means for directing infrared energy along a predetermined optical path from a target to the detector, a first temperature sensor for providing a reading in the form of an electrical signal corresponding to ambient temperature, a reference body which moves into and out of the optical path so that the detector reading corresponds alternately to the infrared energy from the target and the infrared energy from the reference body, a second temperature sensor for providing a reading in the form of an electrical signal corresponding to the temperature of the reference body, signal processing means responsive to the signals from the infrared detector and the temperature sensors for calculating the temperature of the target and providing an output signal corresponding thereto, and display means responsive to the output signal for displaying the temperature of the target, said signal processing means employing a look up table and the following relationship in calculating temperature of the target:

$$N_S(T_S) = \frac{K_G(S_1 - S_2) - N_A(T_A)(1 - E_S) + N_F(T_F)}{E_S},$$

where $N_S(T_S)$ is the radiance of a black body radiator at the temperature of the target, $K_G$ is a constant, $S_1$ is the detector reading corresponding to the target, $S_2$ is the detector reading corresponding to the reference body, $N_A(T_A)$ is the radiance of a black body radiator at the ambient temperature measured by the first temperature sensor, $N_F(T_F)$ is the radiance of a black body radiator at the reference body temperature measured by the second temerature sensor, and $E_S$ is the emissivity of the target.

2. The instrument of claim 1 further including means for storing data corresponding to a previous temperature calculation, and means for conditioning the signal processing means to combine the stored data with the signals from the detector and the temperature sensors in determining the temperature to be displayed.

3. The instrument of claim 1 or claim 2 further including switch means operable externally of the housing for selectively conditioning the signal processing means and the display means to display either an average temperature reading, a maximum temperature reading, a minimum temperature reading, or the difference between the maximum temperature reading and the minimum temperature reading.

4. The instrument of claim 1 wherein the display means includes a digital display for displaying the temperature of the target and an additional display responsive to successive ones of the output signals for indicating whether the temperature of the target is increasing or decreasing between successrve calculations.

5. The instrument of claim 1 wherein the signal processing means includes a microprocessor.

6. The instrument of claim 1 further including means for providing a signal corresponding to the emissivity of the target, and manually operable means for selectively increasing and decreasing said signal.

7. In a hand-held instrument for measuring the temperature of a target without contact with the target: a pistol-shaped housing having a barrel and a handle adapted to be gripped by the hand of a user, a window transparent to infrared radiation at the front end of the barrel, a digital display at the rear of the barrel, an infrared detector within the barrel for providing at least one signal corresponding to infrared radiation from the target impinging therein, optical means for receiving infrared radition through the window from the target and directing said radiation along a predetermined path to detector, means for providing a signal corresponding to ambient temperature, signal processing means including a microprocessor responsive to the target signal and the ambient temperature signal for calcuating the temperature of the target and actuating the display accordingly, and trend indicator means selectively actuated by the microprocessor for indicating whether the temperature of the target is increasing or decreasing.

8. The instrument of claim 7 wherein the trend indicator means includes a first indicator which is actuated when the temperature increase a first predetermined amount, a second indicator which is actuated when the temperature increases a second predetermined amount, a third indicator which is actuated when the temperature decreases a first predetermined amount, and a fourth indicator which is actuated when the temperature decreases a second predetermined amount.

9. The instrument of claim 7 wherein the means for providing a signal corresponding to ambient temperature comprises a first temperature sensor positioned in the barrel immediately behind the window, a reference body adapted for movement into the optical path so that the detector signal corresponds alternately to infrared radiation from the target and infrared radiation from the reference body, and a second temperature sensor for monitoring the temperature of the reference body.

10. The instrument of claim 9 wherein the temperature of the target is calculated according to the relationship $$N_S(T_S) = \frac{K_G(S_1-S_2)-N_A(T_A)T_W(1-E_S)-N_A(T_A)(1-T_W)+N_F(T_F)}{E_S T_W},$$

where $N_S(T_S)$ is the radiance of a black body radiator at the temperature of the target, $K_G$ is a constant, $S_1$ is the detector reading for the target, $S_2$ is the detector reading for the reference body, $N_A(T_A)$ is the radiance of a black body radiator at the ambient temperature measured by the first temperature sensor, $N_F(T_F)$ is the radiance of a black body radiator at the reference body temperature measured by the second temperature sensor, $T_W$ is the transmissivity of the window, and $E_S$ is the emissivity of the target.

11. The instrument of claim 10 further including means for providing a signal corresponding to the emissivity of the target and manually operable means for selectively incrementing and decrementing said signal.

12. In an instrument for measuring the temperature of a target without contact with the target: means for receiving infrared radiation from the target and providing a signal corresponding thereto, means for providing a signal corresponding to the emissivity of the target, display means, signal processing means responsive to the target signal and the emissivity signal for calculating the temperature of the targe and for conditioning the display means to display the same, manually operable means for increasing or decreasing the emissivity signal while the temperature is being displayed whereby the instrument can be calibrated by adjusting the emissivity signal unitl the displayed temperature corresponds to the temperature of a target of known temperature, and trend indicator means responsive to the signal processing means for indicating whether the temperature of the target is increasing or decreasing.

13. The instrument of claim 12 further including means for conditioning the display means to display the emissivity signal whereby the instrument can also be calibrated by adjusting the emissivity signal so that the displayed value of emissivity corresponds to the emissivity of a target of known emissivity.

14. The instrument of claim 12 wherein the trend indicator means includes a first indicator which is actuated when the temperature increases a first predetermined amount, a second indicator which is actuated when the temperature increases a second predetermined amount, a third indicator which is actuated when the temperature decreases a first predetermined amount, and a fourth indicator which is actuated when the temperature decreases a second predetermined amount.

15. In a hand-held instrument for measuring the temperature of a target without contact with the target, a housing adapted to be held in the hand of the user means within the housing for receiving infrared radiation from the target and providing an analog signal corresponding thereto, means within the housing for providing an analog signal corresponding to ambient temperature, means within the housing for converting the analog signals to digital signals, digital signal processing means including a microprocessor within the housing for combining the digital signals to calculate the temperature of the target and providing an output signal corresponding thereto, digital display means visible externally of the housing and responsive to the output signal for indicating the temperature of the target, and trend indicator means selectively actuated by the microprocessor for indicating whether the temperature of the target is increasing or decreasing.

16. The instrument of claim 15 wherein the trend indicator means includes a first indicator which is actuated when the temperature increases a first predetermined amount, a second indicator which is actuated when the temperature increases a second predetermined amount, a third indicator which is actuated when the temperature decreases a first predetermined amount, and a fourth indicator which is actuated when the temperature decreases a second predetermined amount.

17. The instrument of claim 15 wherein the signal processing means includes memory means for storing the output signal from at least one previous calculation, said stored signal being combined with the digital signals to provide the signal to be displayed.

18. The instrument of claim 17 wherein the signal processing means is programmed to determine average temperature, maximum temperature, minimum temperature, and the difference between the maximum temperature and the minimum temperature, and means is included for selectively conditioning the display means to display the average temperature, the maximum temperature, the minimum temperature, or the difference between the maximum temperature and the minimum temperature.

* * * * *